(12) United States Patent
Oh et al.

(10) Patent No.: US 7,782,541 B2
(45) Date of Patent: *Aug. 24, 2010

(54) VARIABLE FOCUS LENS HAVING A PLURALITY OF PROTRUSIONS AT ONE END OF FLUID CHAMBER

(75) Inventors: Byung Do Oh, Gyunggi-Do (KR); Young Kyu Park, Gyunggi-Do (KR)

(73) Assignee: Saumsung Electro-Mechanics Co., Ltd., Suwon (KR)

( * ) Notice: Subject to any disclaimer, the term of this patent is extended or adjusted under 35 U.S.C. 154(b) by 640 days.

This patent is subject to a terminal disclaimer.

(21) Appl. No.: 11/641,721

(22) Filed: Dec. 20, 2006

(65) Prior Publication Data

US 2007/0153400 A1   Jul. 5, 2007

(30) Foreign Application Priority Data

Dec. 29, 2005   (KR) ...................... 10-2005-0133804

(51) Int. Cl.
G02B 3/14   (2006.01)
(52) U.S. Cl. ...................................... 359/666; 359/665
(58) Field of Classification Search .......... 359/665–667
See application file for complete search history.

(56) References Cited

U.S. PATENT DOCUMENTS 7,333,272 B2 *   2/2008   Oh et al. ..................... 359/666

FOREIGN PATENT DOCUMENTS

| JP | 2002-162506 | | 6/2002 |
|---|---|---|---|
| JP | 2002162506 A | * | 6/2002 |
| WO | WO 03/069380 A1 | | 8/2003 |
| WO | WO 2004/099847 | | 11/2004 |
| WO | WO 2005/073778 | | 8/2005 |
| WO | WO 2005/073779 | | 8/2005 |

OTHER PUBLICATIONS

Extended European Search Report, mailed Mar. 13, 2007 and issued in corresponding European Patent Application No. 06256628.6-2217.

* cited by examiner

Primary Examiner—Scott J Sugarman

(57) ABSTRACT

The present invention relates to a variable focus lens including a fluid chamber containing first and second fluids which are non-miscible and have different refractive indices, the fluid chamber having a plurality of protrusions formed along a circumference of one open end thereof. The variable focus lens also includes a transparent plate attached to the open end of the chamber via a sealing with a predetermined interval from the protrusions. The variable focus lens further includes a first electrode disposed inside the chamber to act on the first fluid and a second electrode disposed inside the chamber and is insulated from the first fluid. The invention allows an easy manufacturing process without bubble formation, and eliminates entry and formation of bubbles due to external changes such as in temperature and pressure, thereby allowing good performance of the lens regardless of external environmental changes.

6 Claims, 12 Drawing Sheets

VARIABLE FOCUS LENS HAVING A PLURALITY OF PROTRUSIONS AT ONE END OF FLUID CHAMBER

CLAIM OF PRIORITY

This application claims the benefit of Korean Patent Application No. 2005-133804 filed on Dec. 29, 2005, in the Korean Intellectual Property Office, the disclosure of which is incorporated herein by reference.

BACKGROUND OF THE INVENTION

1. Field of the Invention

The present invention relates to a variable focus lens, and more particularly, to a variable focus lens which has a plurality of protrusions formed at one end of a chamber to prevent bubble formation and absorbs volume change of fluid due to changes in external environment such as temperature and pressure to eliminate entry or formation of bubbles, thereby functioning well as a lens regardless of external changes.

2. Description of the Related Art

In general, a camera is equipped with a plurality of lenses and is configured to adjust optical focus distance by driving the lenses respectively to vary the relative distances thereof. Due to the miniaturization of optical devices such as a camera with a lens mounted therein, the miniaturization of the lens is increasingly required in turn.

In order to meet the needs for miniaturization, a variable focus lens has been disclosed in PCT WO 03/069380.

FIG. 1 is a schematic cross-sectional view of the variable focus lens suggested in an embodiment of WO 03/069380.

As shown in FIG. 1, the variable focus lens includes a fluid chamber 5 with a cylindrical wall, containing first fluid A and second fluid B therein which are non-miscible and have different refractive indices. The first and second fluids A and B are in contact over a meniscus 14 in between. The variable focus lens also includes a fluid contact layer 10 disposed on an inner side of the cylindrical wall of the fluid chamber 5, a first electrode 2 separated from the first fluid A and the second fluid B by the fluid contact layer 10 and a second electrode 12 acting on the second fluid B.

The first electrode 2 has a cylindrical shape and is coated by an insulating layer 8 with metallic material. The second electrode 12 is disposed at one end of the fluid chamber 5.

In addition, the fluid chamber 5 is covered by transparent front and back elements 4 and 6 to house the fluids A and B.

In addition, a sealing (shown in FIG. 4 and denoted by reference numeral 16) is provided to bond the front element 4 with the fluid contact layer 10.

The operation of the variable focus lens with the above described configuration is as explained hereunder.

When no voltage is applied between the first electrode 2 and the second electrode 12, the fluid contact layer 10 has a higher wettability with respect to the first fluid A than the second fluid B.

Due to electrowetting, wettability by the second fluid B varies under the application of voltage between the first and second electrodes, which changes the contact angle Q1, Q2 and Q3 of the meniscus 14 as shown.

Therefore, the shape of the meniscus is variable in response to the voltage applied, thereby adjusting the focus of the lens.

That is, as shown in FIGS. 1 to 3, in accordance with the magnitude of the voltage applied, the angle of the meniscus 14 and the fluid contact layer 10 measured in the side of the first fluid B changes from an obtuse angle to an acute angle, for example, in the order of 140°, 100°, 60°, etc.

Herein, FIG. 1 shows a lens configuration with high negative power, FIG. 2 shows a lens configuration with low negative power and FIG. 3 shows a lens configuration with positive power.

The variable focus lens using the fluid as described above has an advantage for miniaturization over the conventional method of adjusting focal distance by mechanically operating the lenses.

However, the conventional variable focus lens has drawbacks as shown in FIG. 4. That is, as the variable focus lens contains fluids, if the fluids are not properly sealed, bubbles 18 may be formed inside the chamber 5 as shown in FIG. 4.

The drawbacks of the conventional variable focus lens will now be explained in greater detail with reference to FIGS. 5 and 6.

First, as shown in FIG. 5, the fluids A and B are filled between the space between the chamber walls 30, forming a convex surface, but not to the degree of flowing over an upper end 32 of the chamber wall. At this state, an upper transparent plate 40 is moved downward in the direction indicated by the arrow C, the fluid A contacts the undersurface of the upper transparent plate 40 and spreads along the undersurface of the upper transparent plate. Thus, when the upper transparent plate 40 is completely attached to the chamber wall 30, a bubble V is formed in the middle of the fluid A as shown in FIG. 6. The fluid lens is not usable if such a bubble is formed. This is an example of the problem described with reference to FIG. 4.

To prevent such a problem, the lens can be assembled inside the liquid, which however does not completely suppress the formation of the bubbles, diminishes productivity and hinders mass production of lens.

SUMMARY OF THE INVENTION

The present invention has been made to solve the foregoing problems of the prior art and therefore an object of certain embodiments of the present invention is to provide a variable focus lens which has a plurality of protrusions formed on one end of a chamber to prevent formation of bubbles.

Another object of certain embodiments of the invention is to provide a variable focus lens which has a plurality of protrusions formed at one end of a chamber to absorb volume change of fluid due to changes in external environment such as temperature and pressure, eliminating bubble entry or formation due to the volume change of the fluid, thereby allowing good performance of the lens regardless of external changes.

According to an aspect of the invention for realizing the object, there is provided a variable focus lens including: a fluid chamber containing first and second fluids which are non-miscible and have different refractive indices, the fluid chamber having a plurality of protrusions formed along a circumference of one open end thereof; a transparent plate attached to the open end of the chamber via a sealing with a predetermined interval from the protrusions; a first electrode disposed inside the chamber to affect the first fluid; and a second electrode disposed inside the chamber and is insulated from the first fluid.

According to certain embodiments of the present invention, the chamber is made of a transparent material, and has a closed end with a predetermined thickness opposing to the open end.

According to certain embodiments of the present invention, the first fluid is conductive and the second fluid is non-conductive.

According to certain embodiments of the present invention, each of the protrusions has a sectional shape of one selected from a group consisting of a triangle, a rectangle and a trapezoid.

According to certain embodiments of the present invention, the variable focus lens according to claim 1, further includes a second transparent plate attached to the other end of the chamber.

According to certain embodiments of the present invention, an innermost one and a next one of the plurality of protrusions form a space with a dimension corresponding to 1% of a total volume of the first and second fluids.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 7:
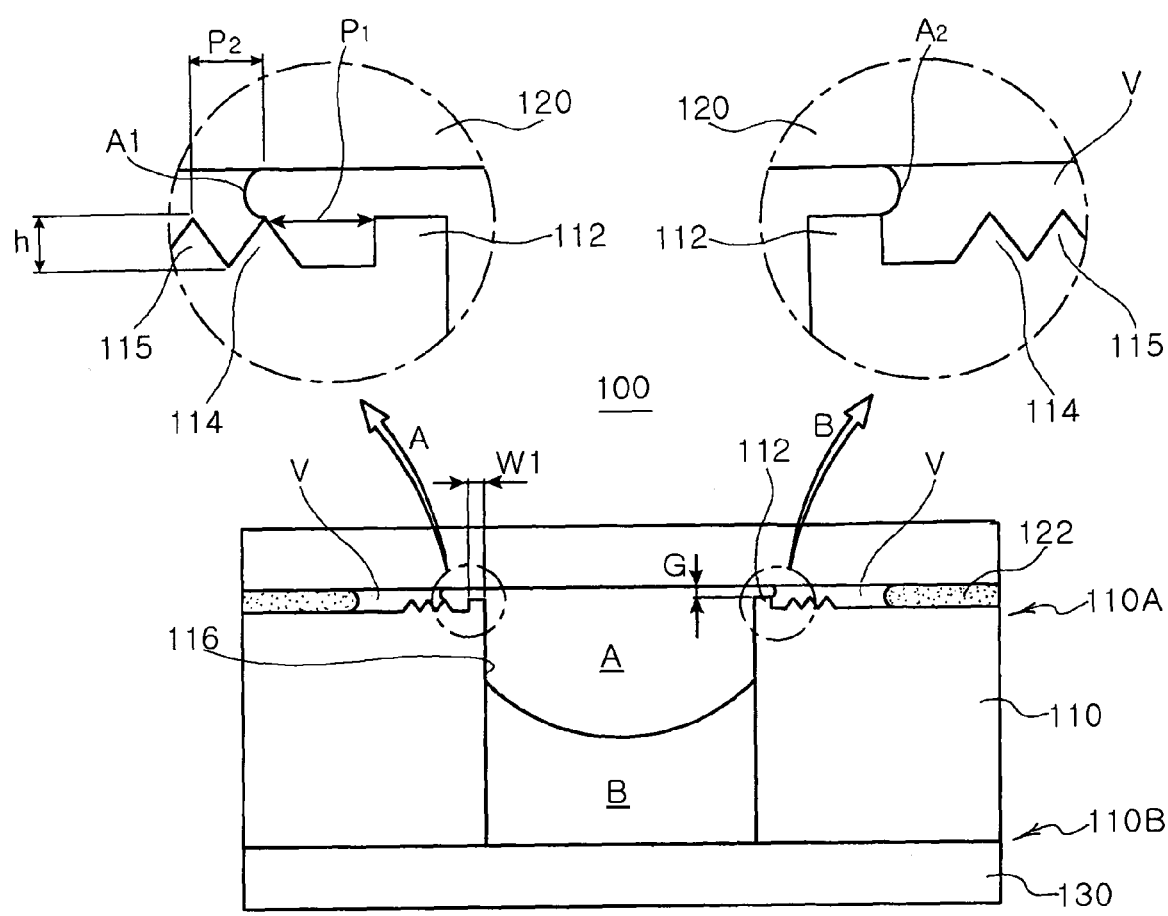
FIG. 7 is a sectional view illustrating a configuration of a variable focus lens according to an embodiment of the present invention.

First, FIG. 7 illustrates a configuration of a variable focus lens 100 according to an embodiment of the present invention.

The variable focus lens 100 includes a chamber wall 110 forming a cylindrical inner space with a first bump or protrusion 112, a second protrusion 114 and two third protrusions 115 formed on one end thereof, an upper transparent plate 120 attached to an upper end 110A of the chamber wall 110 with a predetermined interval G in between and a lower transparent plate 130 attached to a lower end 110B of the chamber wall 110.

Here, the first protrusion 112 has a rectangular section and each of the second and third protrusions 114 and 115 has an inverted triangular section. Thus, three grooves are formed by the first protrusion 112, the second protrusion 114 and the third protrusion 115.

At this time, the upper transparent plate 120 and the chamber wall 110 are hermetically attached to each other via a sealing 122, and the lower transparent plate 130 and the chamber wall 110 are bonded with each other by a bonding layer (not shown). The bonding can be done for example by frit bonding. Alternatively, the lower transparent plate 130 can be formed integrally with the chamber wall 110. For example, a groove can be machined as the chamber in a transparent plate to form a lens body having the lower transparent plate integrated with the chamber wall.

In the meantime, non-miscible first and second fluids A and B are filled in the inner space of the chamber formed by the chamber wall 110 and upper and lower transparent plates 120 and 130. The first and second fluids A and B are provided in substantially the same proportions but have different refractive indices. In addition, one is a conductive fluid while the other one is non-conductive fluid. In this embodiment of the present invention, the fluid A is conductive while the fluid B is non-conductive.

Examining a part denoted by reference sign A in FIG. 7, a portion of the fluid A fills a space between the first protrusion 112 and the second protrusion 114 and forms a bulging surface A1 between the tip of the second protrusion 114 and the upper transparent plate 120. And the fluid A is in complete contact with the upper transparent plate 120 in the area from the tip of the protrusion 112 to the inner space of the chamber. Also, as described later with reference to FIG. 12, if the amount of fluid A is too much, a portion may drip and stay in the form of droplet D1 in a bubble region or a void V between the protrusion 114 and the upper transparent plate 120. As a result, a bubble exists in an outward area from the protrusion 114, i.e., in the void V between the protrusion 114 and the sealing 122 but not in the inward area of the protrusion 114 inside of the chamber. Such a bulging surface A1 is formed in a circle along the area between the protrusion 114 and the upper transparent plate 120. This circular fluid region seen from above is illustrated in FIG. 8(a).

With fluid A filled in the space between the first and second protrusions 112 and 114, when the volume of the fluids A and B change according to the temperature change, the surplus portion of the first fluid A forming the bulging surface A1 moves toward the chamber. As a result, bubbles are not formed in the inward area of the first protrusion 112.

Figure 8:
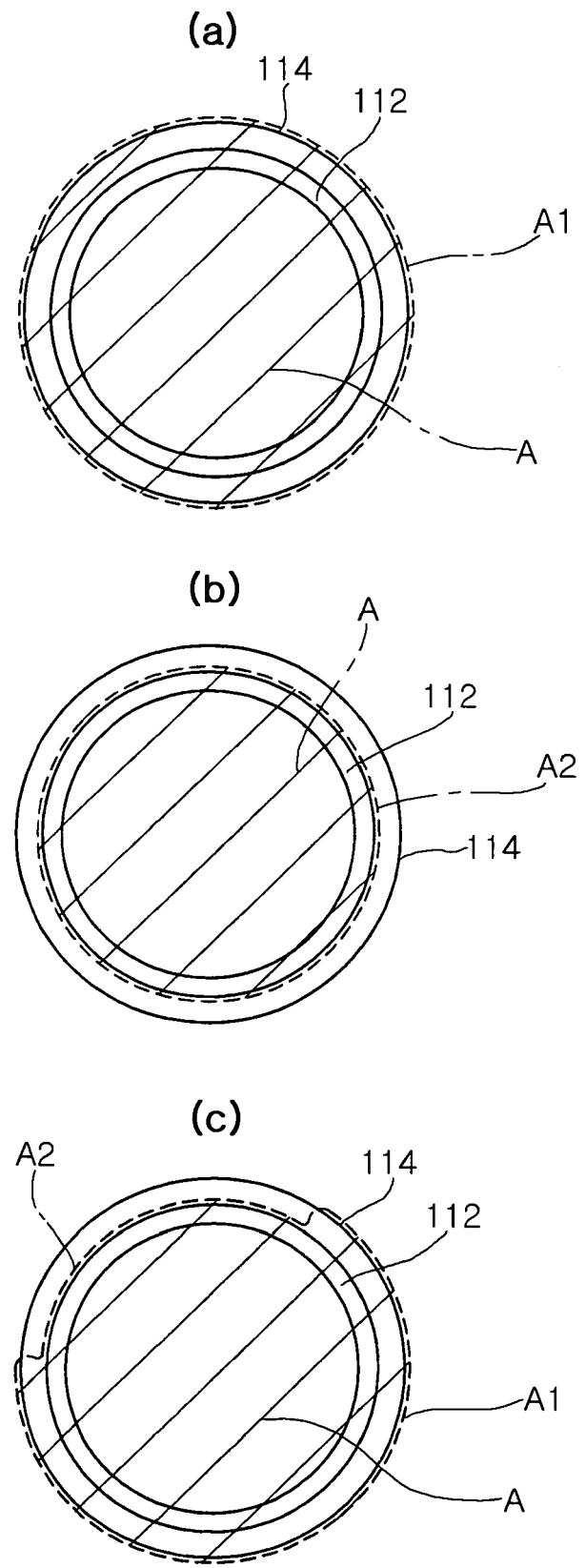
FIG. 8 is a plan view illustrating a fluid region of the variable focus lens shown in FIG. 7.

Also, as shown in the part denoted by reference sign B in FIG. 7 and in FIG. 8(b), the bulging surface A2 of the fluid A may be formed along the area between the first protrusion 112 and the upper transparent plate 120.

Moreover, as shown in FIG. 8(c), a portion of fluid A may form the bulging surface A2 along the area between the first protrusion 112 and the upper transparent plate 120, and another portion of fluid A may form the bulging surface A1 along the area between the second protrusion 114 and the upper transparent plate 120.

Such a bulging surface A1, A2 is determined by the amount or volume change of fluid A.

Figure 9:
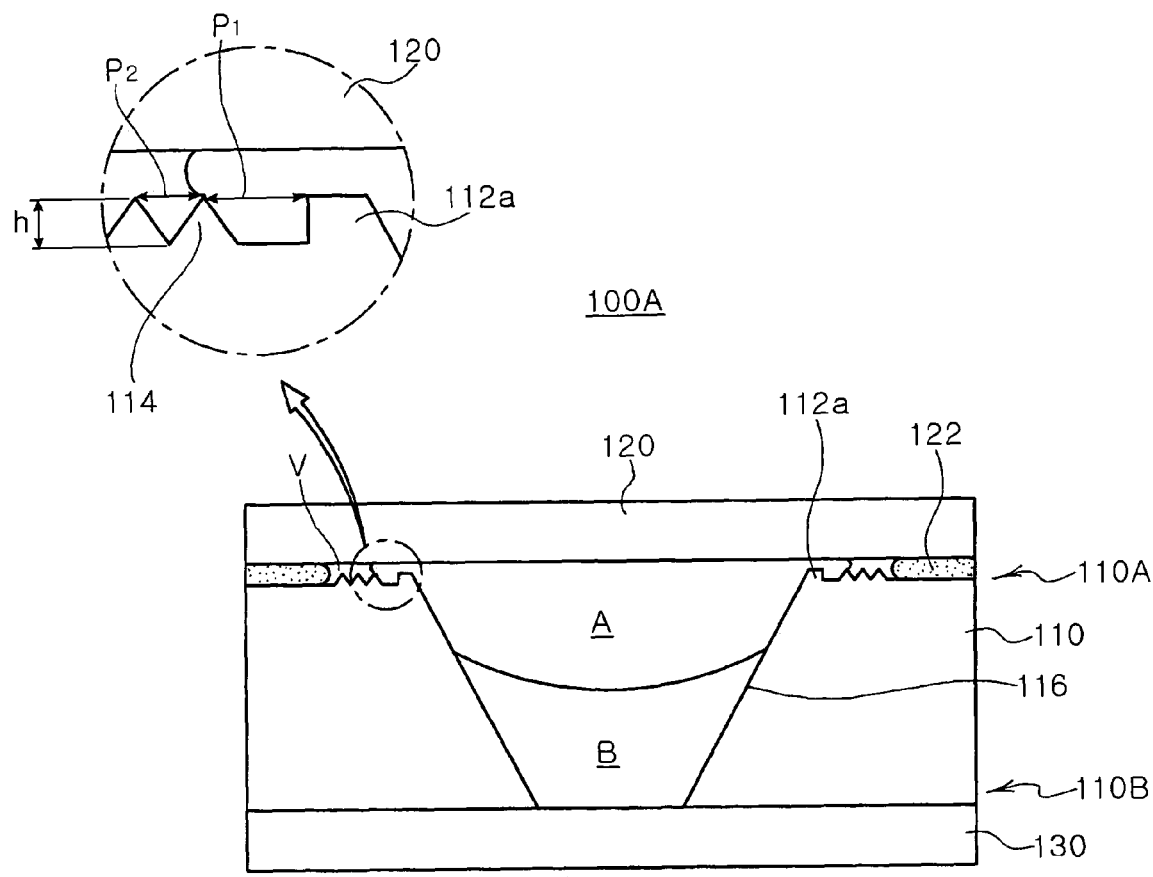
FIG. 9 is a sectional view illustrating a configuration of a variable focus lens according to another embodiment of the present invention.

FIG. 9 illustrates a configuration of a variable focus lens 100A according to another embodiment of the present invention.

In the variable focus lens 100A in FIG. 9, the chamber wall 110 has an inner surface 116 sloped inward toward the bottom thereof. Therefore, the chamber wall 110 has an inner diameter decreasing from an upper end 110A to a lower end 110B. Such a sloped construction is applied to optimize the initial conditions of the first and second fluids A and B, and the angle of the slope is configured to vary according to the contact angles of the fluids A and B. According to this configuration, the first protrusion 112a has a trapezoidal section.

Except for this sloped configuration, the variable focus lens 100A has substantially the same configuration with that of FIG. 7, and thus additional explanation is omitted.

Figure 10:
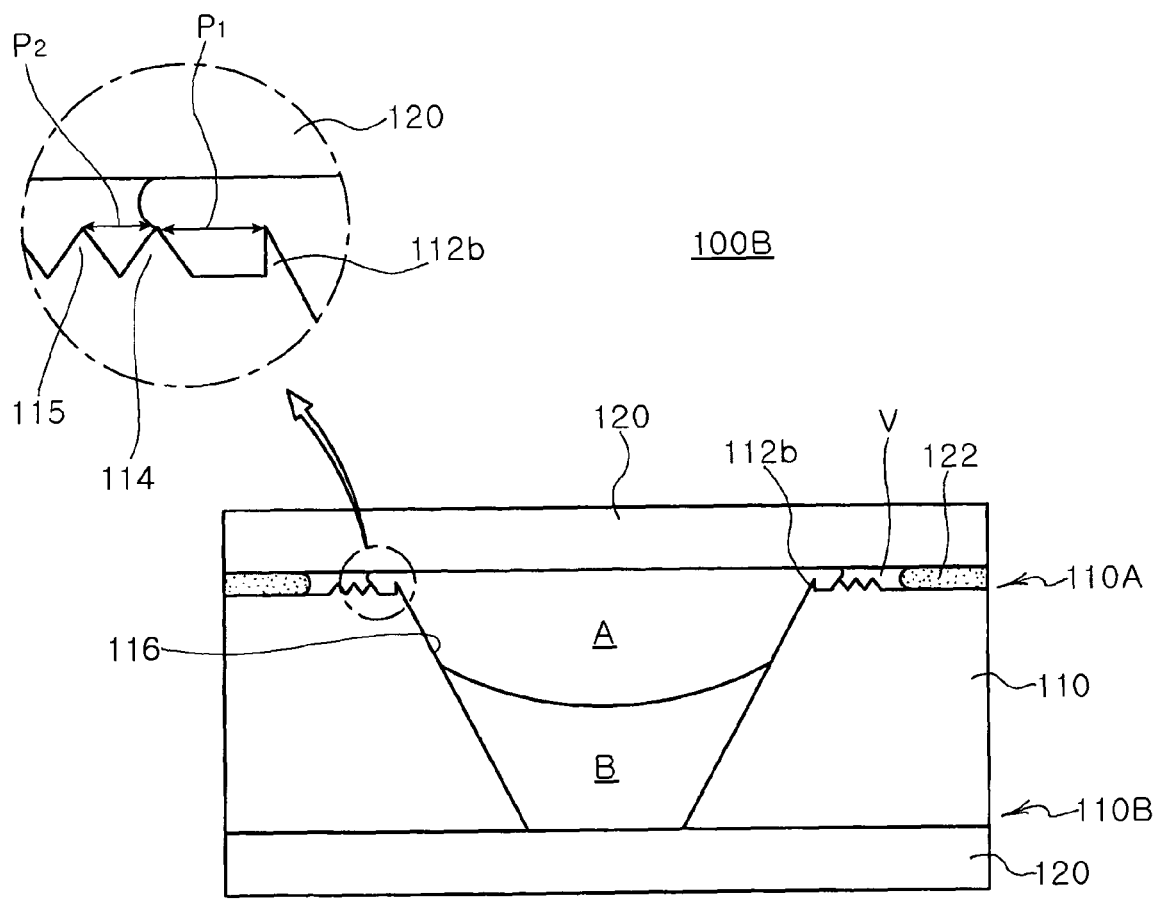
FIG. 10 is a sectional view illustrating a variable focus lens according to further another embodiment of the present invention.

FIG. 10 illustrates a configuration of a variable focus lens 100B according to further another embodiment of the present invention.

Except for the sharp tip of the first protrusion 112b, the variable focus lens 100B in FIG. 10 has substantially the same configuration with that of FIG. 9. Of course, the first protrusion 112b with the sharp tip can also be adopted in the configuration of FIG. 7.

Figure 11:
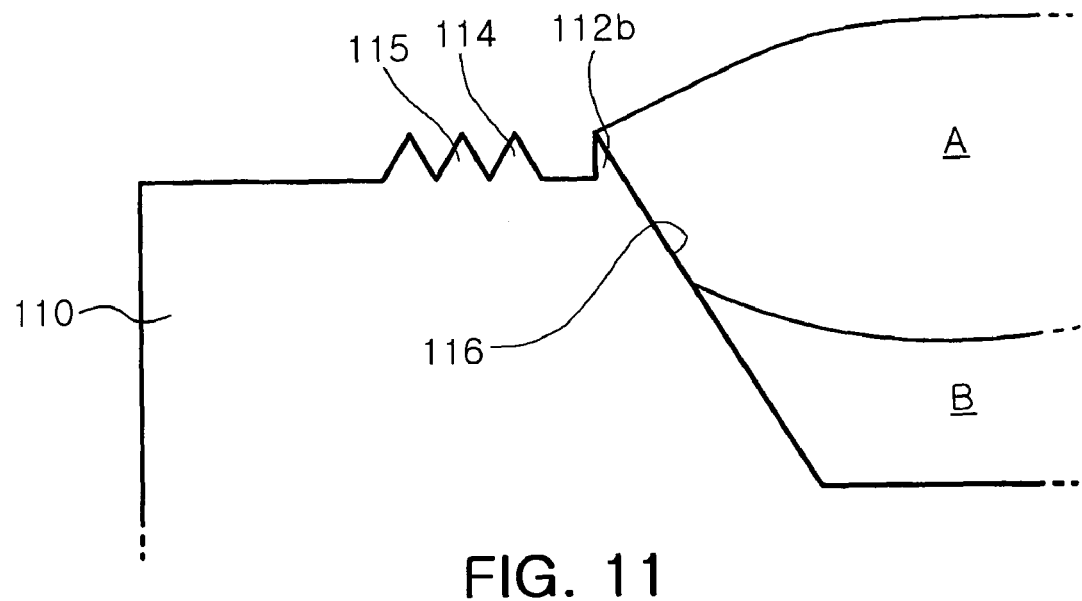
FIGS. 11 to 13 are sectional views illustrating the shape and effects of meniscus of the variable focus lens shown in FIG. 10.
Figure 12:
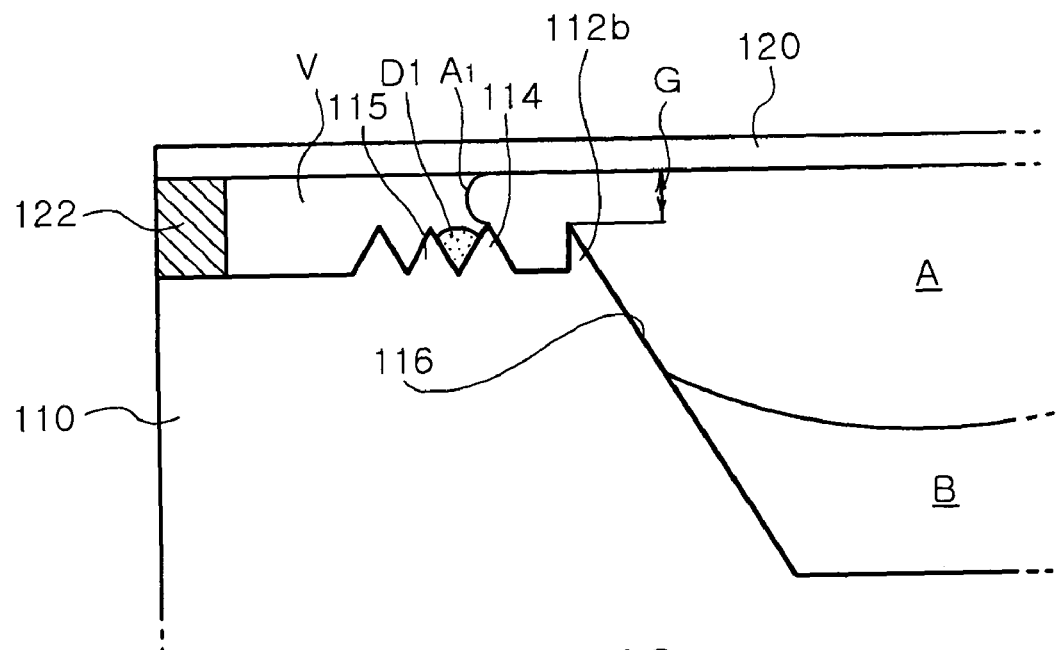
Figure 13:
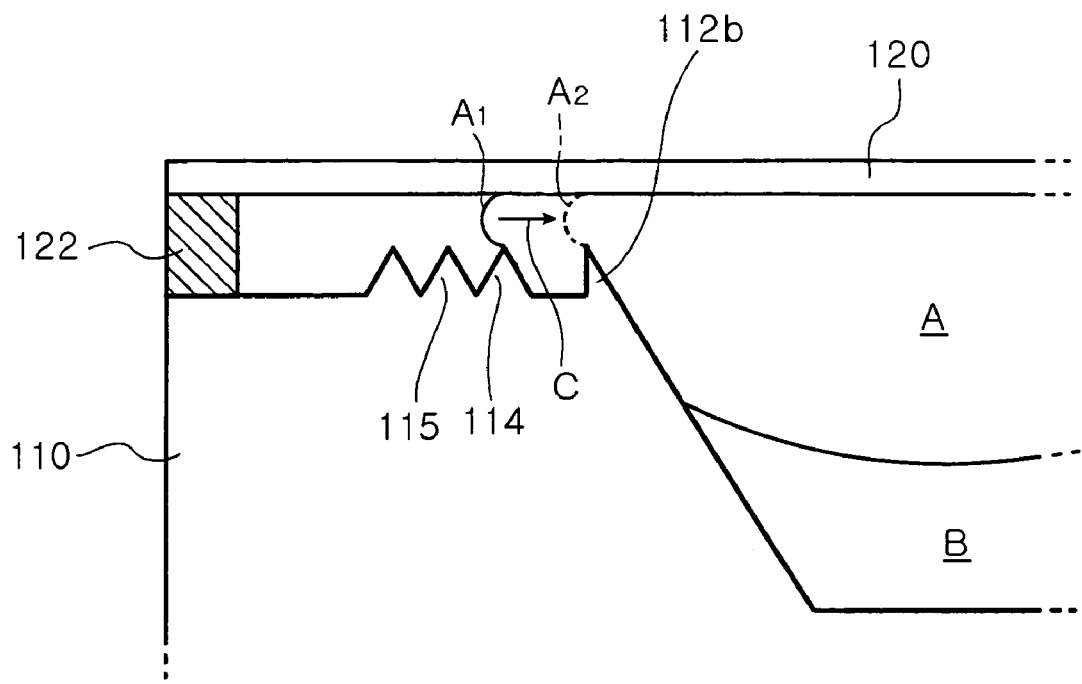

FIGS. 11 to 13 are sectional views illustrating shapes and effects of menisci of the variable focus lens shown in FIG. 10. For the sake of convenience, the explanation is based on the structure of FIG. 10, but the same can be applied to the structures of FIGS. 7 and 9.

When the fluid B and then the fluid A are precisely injected, the fluid A on the top is bulged upward beyond the level of the protrusion 112b. This shape is exaggerated for convenience in explanation, and since the actual injection amount of the fluid A is precisely regulated, the size of the portion of the fluid A bulging upward beyond the protrusion 112b is insignificant.

In this state, when the upper transparent plate 120 is vertically attached to the chamber wall 110, the bulging portion of the fluid A first comes into contact with an undersurface of the transparent plate 120 and pressed by the transparent plate 120 to be spread outward, i.e., toward the first protrusion 112b. As a result, the fluid A forms and stays in a bulging shape between the protrusion 114 and the transparent plate 120 as shown in FIG. 12.

In other words, as the fluid A comes into contact with an undersurface of the upper transparent plate 120, it spreads along the undersurface of the upper transparent plate 120. At this time, the fluid A fills in the space between the first protrusion 112b and the second protrusion 114, and forms and maintains the bulging surface A1 between the second protrusion 114 and the upper transparent plate 120. This is because the force (or surface tension) of the fluid A and the tip of the second protrusion 114 and is greater than the force by which the fluid A spreads along the undersurface of the upper transparent plate 120, thus capturing fluid A between the second protrusion 114 and the upper transparent plate 120. This can be understood by the similar example of water drop forming a bulging shape on a planar surface.

In the meantime, if the amount of the fluid A is too much so that there is a surplus after filling in the inward area of the protrusion 112b, the surplus of the fluid A overpowers the force working between the protrusion 112b and the upper transparent plate 120 and falls from the tip of the second protrusion 114 in a droplet. This surplus fluid forms a droplet D1 in a groove between the second protrusion 114 and the third protrusion 115 as shown in FIG. 12. In the meantime, if the amount of the surplus fluid or droplet is greater than what can be accommodated by the groove between the second protrusion 114 and the third protrusion 115, this excess amount forms a droplet in a groove between the third protrusions 115.

Figure 1:
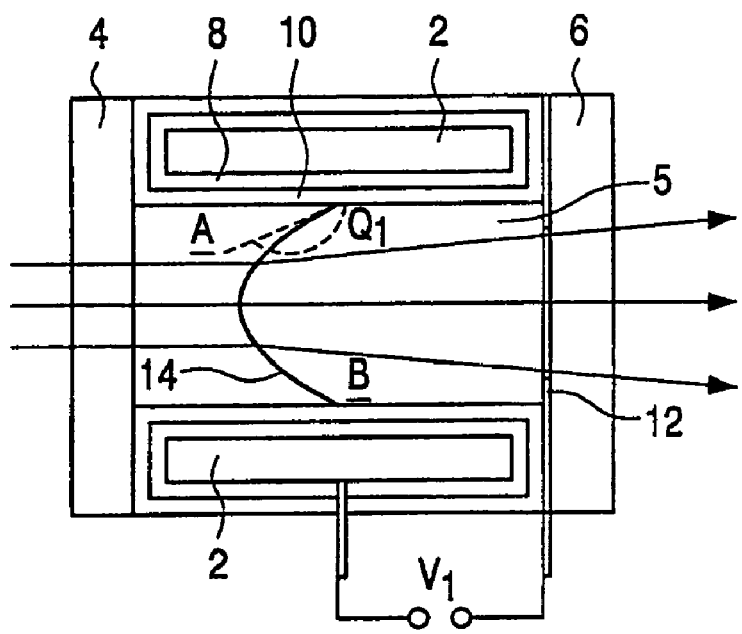
FIGS. 1 to 3 are sectional views illustrating structure and operations of a variable focus lens according to the prior art.
Figure 2:
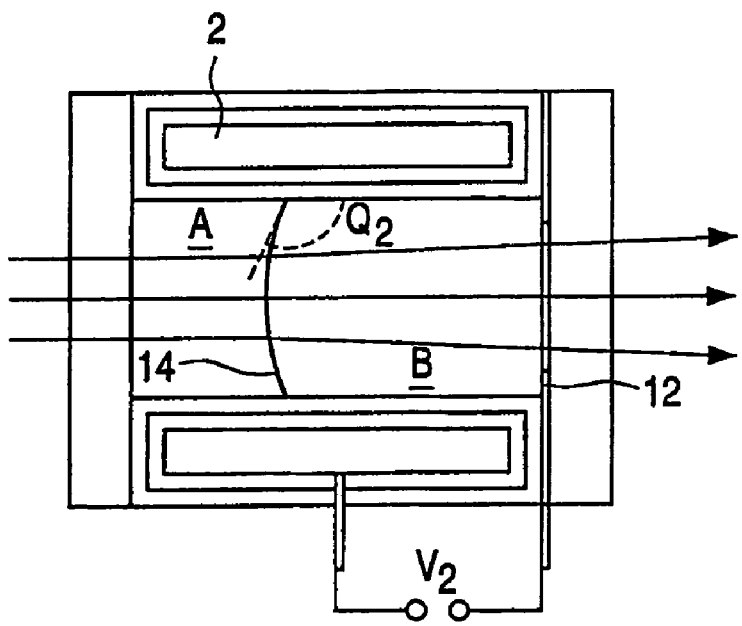
Figure 3:
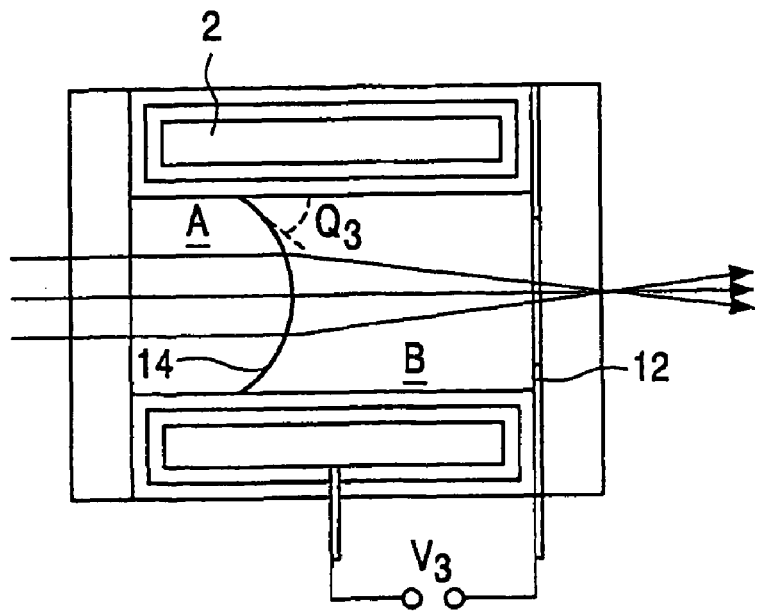
Figure 4:
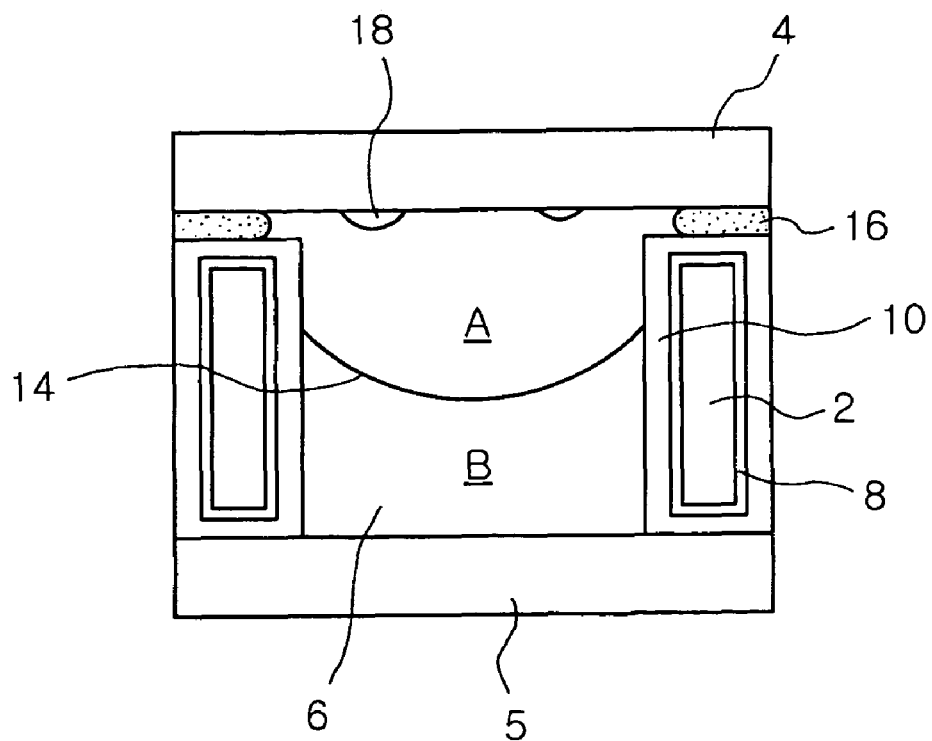
FIG. 4 is a sectional view illustrating the problems with the variable focus lens according to the prior art.
Figure 5:
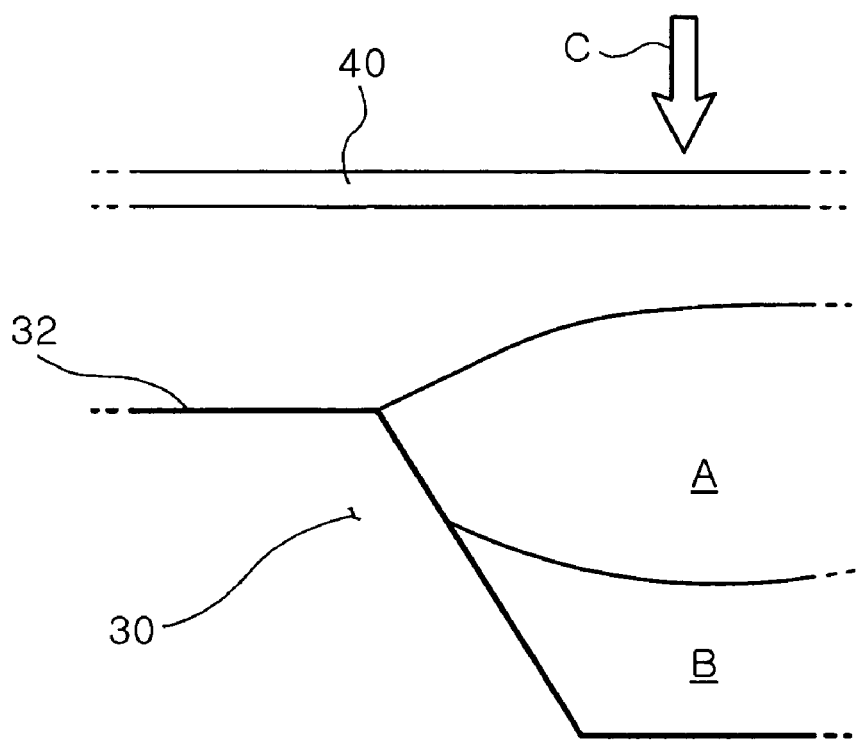
FIGS. 5 and 6 are sectional views illustrating the shape and effects of meniscus of the variable focus lens according to the prior art.
Figure 6:
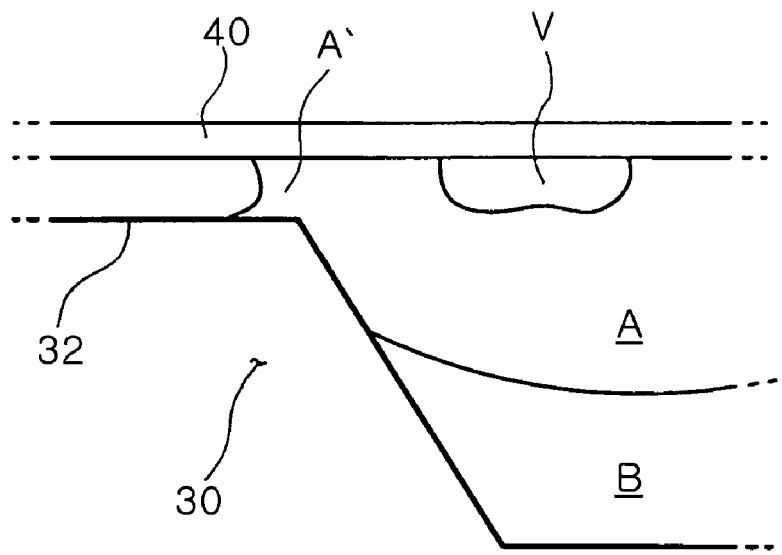

The above described configuration can solve the problem of the prior art depicted in FIGS. 4 to 6.

That is, if the fluid A reaches the tip of the second protrusion 114, rather than spreading as illustrated in FIG. 6, the fluid A stays between the protrusion 114 and the undersurface of the upper transparent plate 120 due to the force working with the protrusion 114. This allows preventing bubble formation depicted in FIGS. 4 to 6. Therefore, the variable focus lens according to the present invention can be easily manufactured in the air, thereby significantly improving productivity.

The above described condition is not limited to the time of mounting the upper transparent plate 120. That is, also when the volume of the fluids A and B is increased due to the increase in temperature, etc., a portion of the fluid A corresponding to the increased volume moves into the groove between the second and third protrusions 114 and 115 and form a droplet D1 as shown in FIG. 12.

Conversely, as shown in FIG. 13, when the volume of the fluids A and B is decreased due to the decrease in temperature, etc., the bulging surface A1 of the fluid A moves in the direction indicated by the arrow C to form the bulging surface A2, supplementing the decreased volume of the fluid in the inward area of the first protrusion 112b. At this time, the bulging surface A2 is formed along the entire or a part of the first protrusion 112b as shown in FIGS. 8(b) and 8(c). That is, when the decrease in the volume is large, the bulging surface A2 can be formed as shown in FIG. 8(b), and when the decrease in the volume is small, both of the bulging surfaces A1 and A2 can be formed.

In consideration of the above described characteristics, the plurality of protrusions in the present invention not only have a function of preventing bubble formation inside the chamber but also a function of absorbing the stress, due to the volume change of the fluids A and B, affecting a fluid lens body.

To allow these effects, the first and second protrusions 112b and 114 are formed in such an interval and width, although there may be variations depending on the characteristics of the fluid A, that bubble formation is prevented during the assembly and the sealed state is maintained while the fluid lens is operating,.

Back to the structure of protrusions in FIG. 10, although the interval G between the protrusions 112b, 114 and 115 and the upper transparent plate 120 is adjustable by the injection amount of the fluid, it is preferably up to 20 μm. The interval G may be adjusted by a stopper, which may be provided as a sealing 122 or other physical means.

Preferably, the interval P1 between the first protrusion 112b and the second protrusion 114 and the interval P2 between the second protrusion 114 and the third protrusion 115 is about 300 μm. In addition, it is preferable that the depth of the spaces between the first, second and third protrusions 112b, 114 and 115, i.e., the height h of these protrusions 112b, 114 and 115 is about 400 μm.

In the meantime, based on the configurations of FIGS. 7 and 9, it is preferable that the first protrusion 112, 112a has a width of up to 300 μm.

Such numbers are determined in the range that can accommodate the volume change of fluids A and B, and the volume change can typically amount to 1% at maximum due to the temperature change, etc. Specifically, when a fluid lens is fabricated in a total volume of about 20 μl, the diameter of this lens is about 5 mm, and thus the first protrusion and the second protrusion can be formed in a width of 300 μm and a height of 400 μm around the lens, which will sufficiently absorb the volume change. Of course, if the volume of the fluid lens is less than 20 μl, the protrusions are adjusted to be formed in smaller values. In order for a stable performance, there may be provided one or more third protrusions.

Now, variations of the plurality of protrusions of the variable focus lens of FIG. 9 will be examined with reference to FIGS. 14a to 14c and 15.

Figure 14A:
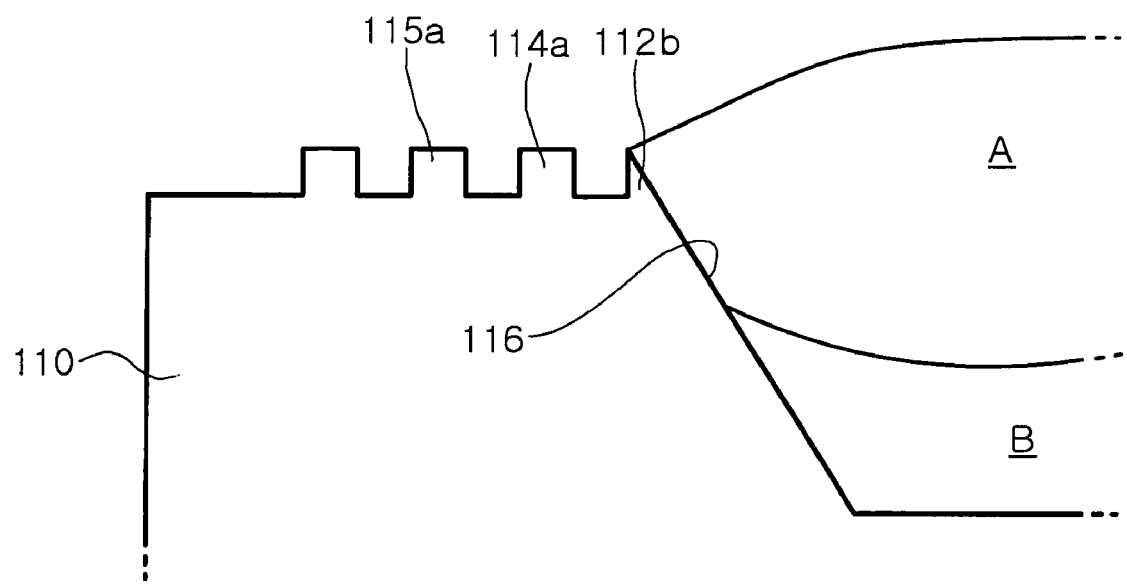
FIGS. 14a to 15 are sectional views illustrating variations of a plurality of protrusions of the variable focus lens shown in FIG. 10.
Figure 14B:
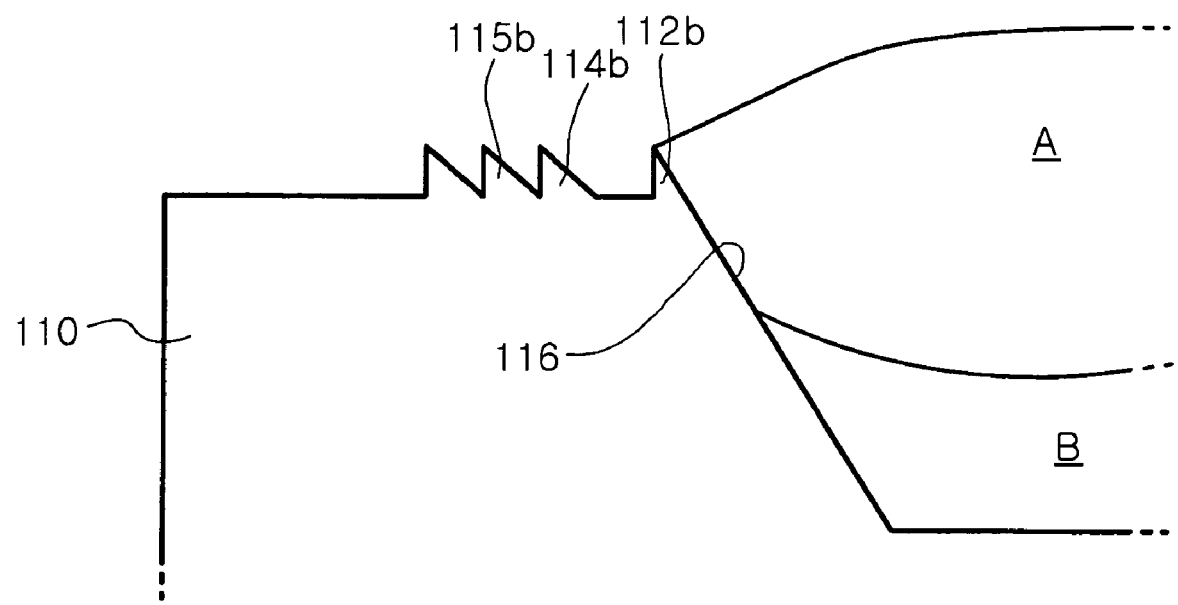
Figure 14C:
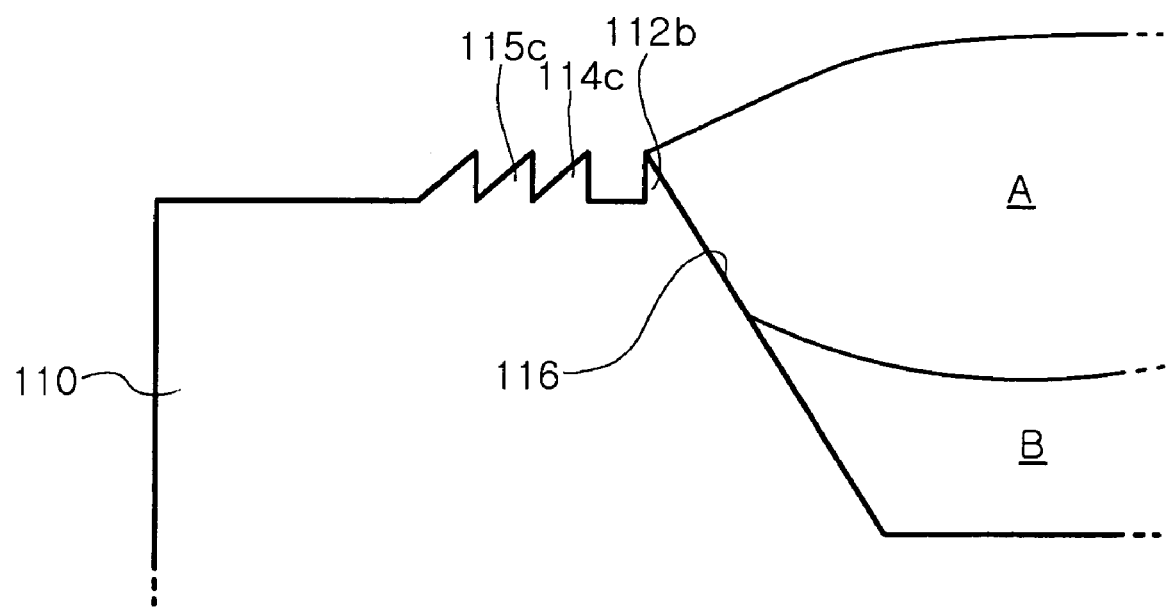

In the variation shown in FIG. 14a, the second and third protrusions 114a and 115a have a rectangular section. In the variations in FIGS. 14b and 14c, the second and third protrusions 114b, 114c, 115b and 115c have a right-triangular section. The shape of the protrusions in FIG. 14b is symmetrical to that in FIG. 14c.

Figure 15:
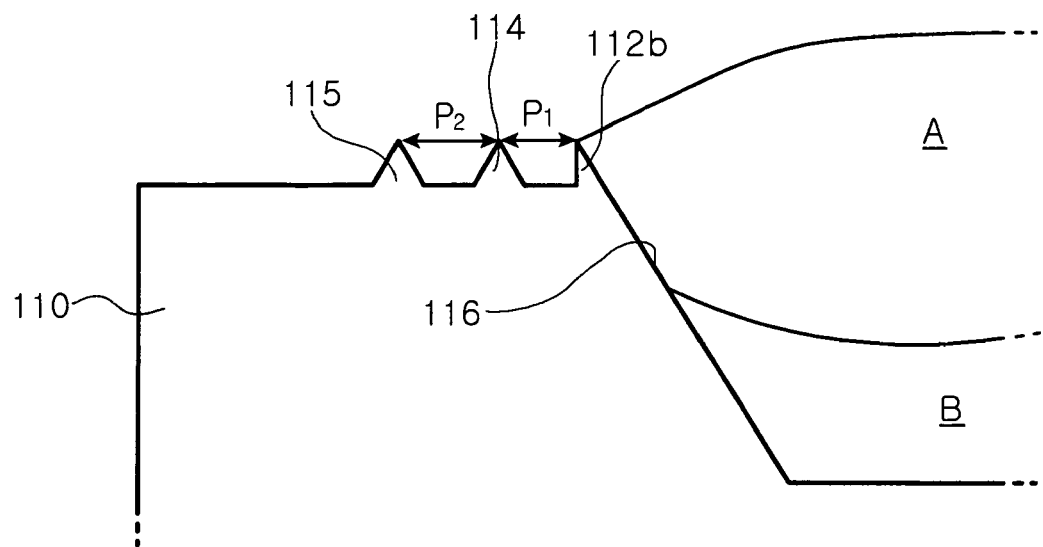

In the variation shown in FIG. 15, the second protrusion 114 is formed at a pre-set interval P1 from the first protrusion 112b. The third protrusion 115 is formed at a pre-set interval P2 from the second protrusion 114.

At this time, it is preferable that the interval P1 and P2 is up to 750 μm. This is because if the interval P1 and P2 exceeds 750 μm, too large a distance between the protrusions 112b, 114 and 115 can hinder the effects expected from forming the second and third protrusions 114 and 115.

Figure 16:
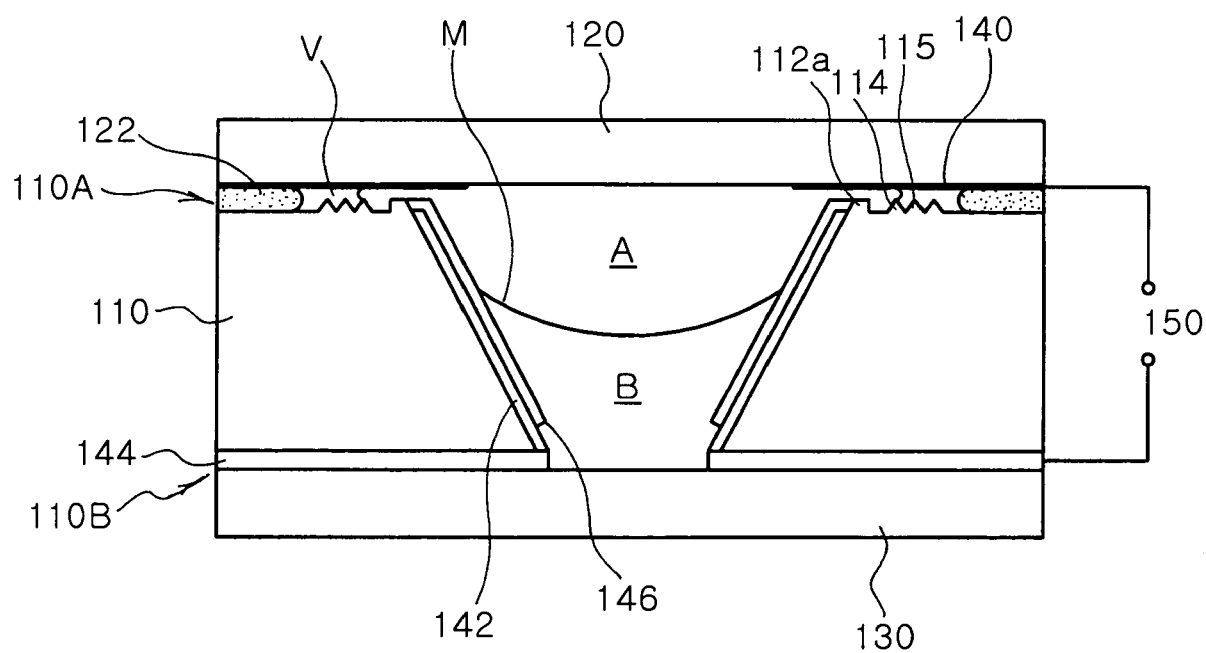
FIGS. 16 and 17 are sectional views illustrating two types of electrodes formed in the variable focus lens shown in FIG. 9.

FIG. 16 illustrates the variable focus lens 100A of FIG. 9 with electrodes 140 and 142 formed therein.

The variable focus lens of FIG. 16 additionally includes a first electrode 140 formed on an undersurface of the upper transparent plate 120, a second electrode 142 formed on an inner surface 116 of the chamber wall 110 and an insulation layer 146 formed on a surface of the second electrode 142 for electric insulation between the first electrode 140 and the second electrode 142. In addition, a conductor 144 is formed on an interface between a lower end 110A of the chamber wall 110 and the lower transparent plate 130 to connect the second electrode 142 with an external power source 150.

Here, the first fluid A is conductive while the second fluid B is non-conductive. The chamber wall 110 is made of insulation material such as glass and ceramics.

Moreover, the power source 150 and an electric wire are provided so that the first electrode 140 is electrically connected to the power source 150 through the electric wire, and the second electrode 142 is electrically connected to the power source 150 through the conductor 144 and the electric wire.

With this configuration, the voltage of the power source 150 can be varied to modify the meniscus M between the first and second fluids A and B, thereby adjusting the focal distance of the variable focus lens.

At this time, to prevent the conductive first fluid A from contacting the second electrode 142 due to the change of the meniscus M, the insulation layer 146 should be formed in an area large enough to cover the second electrode 142.

In the meantime, it is preferable that the first and second electrodes 140 and 142 are formed by a deposition method such as sputtering or electron beam deposition.

This configuration allows a surplus of fluid to form a droplet D1 in the groove between the first and second protrusions 112a and 114.

Figure 17:
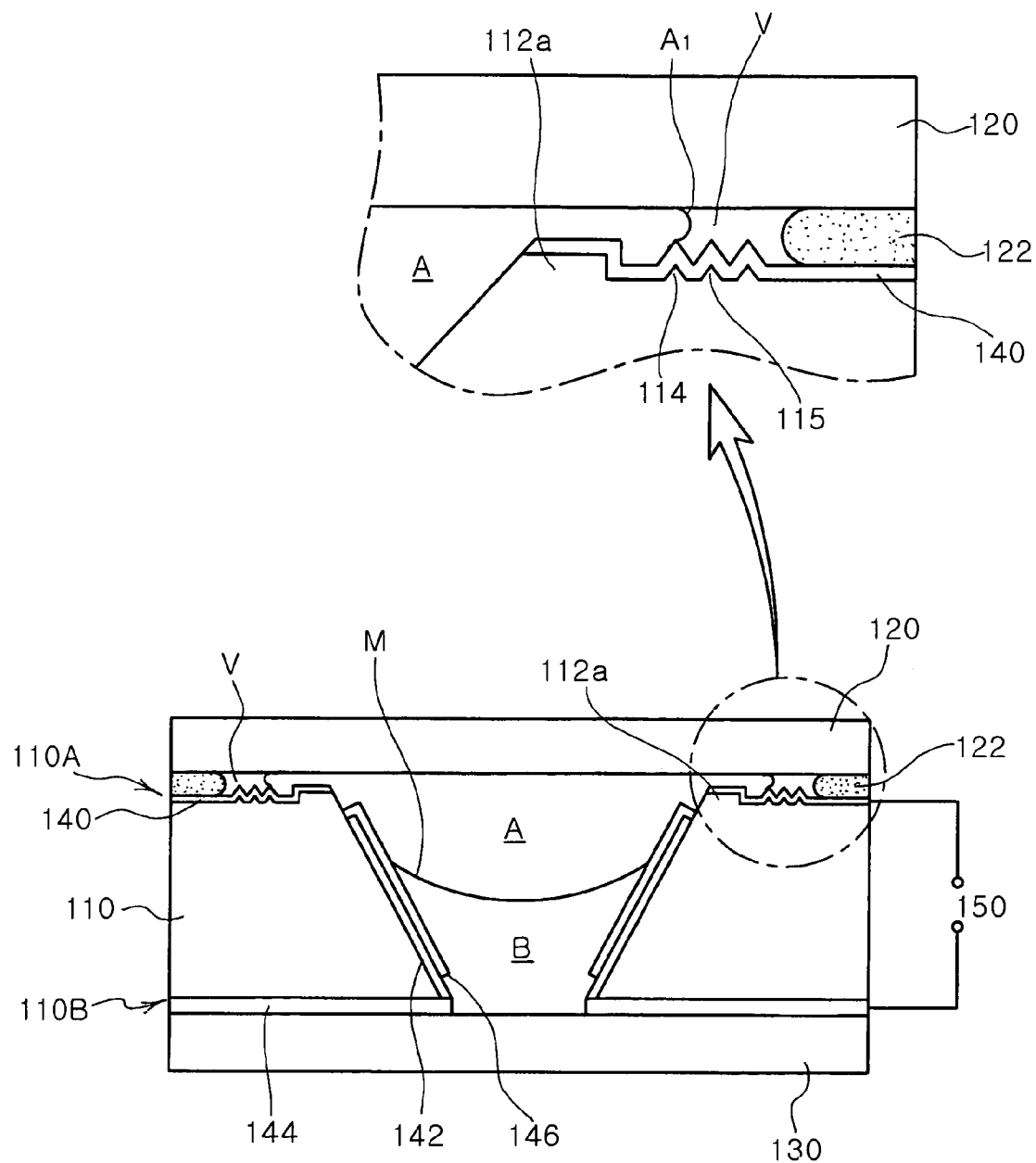

FIG. 17 is a sectional view illustrating the variable focus lens 100A of FIG. 9 with another configuration of electrodes formed therein.

The variable focus lens of FIG. 17 additionally includes a first electrode 140 formed on an upper end 110A of the chamber wall 110 as well as on the protrusions 112a, 114 and 115 opposed to the upper transparent plate 120, a second electrode 142 formed on an inner surface 116 of the chamber wall 110 and an insulation layer 146 formed on a surface of the second electrode 142 for electric insulation between the first electrode 140 and the second electrode 142.

Except for the configuration of the first electrode 140, the rest of the configuration of the variable focus lens is identical to that of FIG. 16, and thus additional explanation is omitted.

According to the present invention as set forth above, the variable focus lens has a plurality of protrusions formed on one end of a chamber to prevent degradation of performance thereof due to bubble formation. In addition, the variable focus lens according to the present invention can be manufactured in the air. Therefore, the variable focus lens has enhanced stability and is easily manufactured to significantly improve productivity. Further, the plurality of protrusions absorb volume change of fluid due to temperature change, etc., thereby eliminating the stress, due to the volume change of the fluid, affecting a lens body.

While the present invention has been shown and described in connection with the preferred embodiments, it will be apparent to those skilled in the art that modifications and variations can be made without departing from the spirit and scope of the invention as defined by the appended claims.

What is claimed is:

1. A variable focus lens comprising:
    a fluid chamber containing first and second fluids which are non-miscible and have different refractive indices, the fluid chamber having a plurality of protrusions formed along a circumference of one open end thereof;
    a transparent plate attached to the open end of the chamber via a sealing with a predetermined interval from the protrusions which are formed in an inner side of the sealing;
    a first electrode disposed inside the chamber to act on the first fluid; and
    a second electrode disposed inside the chamber and is insulated from the first fluid.

2. The variable focus lens according to claim 1, wherein the chamber is made of a transparent material, and has a closed end with a predetermined thickness opposing to the open end.

3. The variable focus lens according to claim 1, wherein the first fluid is conductive and the second fluid is non-conductive.

4. The variable focus lens according to claim 1, wherein each of the protrusions has a sectional shape of one selected from a group consisting of a triangle, a rectangle and a trapezoid.

5. The variable focus lens according to claim 1, further comprising a second transparent plate attached to the other end of the chamber.

6. The variable focus lens according to claim 1, wherein an innermost one and a next one of the plurality of protrusions form a space with a dimension corresponding to 1% of a total volume of the first and second fluids.

* * * * *

UNITED STATES PATENT AND TRADEMARK OFFICE
CERTIFICATE OF CORRECTION

PATENT NO. : 7,782,541 B2  Page 1 of 1
APPLICATION NO. : 11/641721
DATED : August 24, 2010
INVENTOR(S) : Byung Do Oh et al.

It is certified that error appears in the above-identified patent and that said Letters Patent is hereby corrected as shown below:

Title page, item [73] (Assignee), Line 1 delete "Saumsung" and insert -- Samsung --, therefor, Signed and Sealed this
Fifth Day of April, 2011

David J. Kappos
*Director of the United States Patent and Trademark Office*